United States Patent
Kaletta et al.

Patent Number: 5,091,532
Date of Patent: Feb. 25, 1992

[54] PROCESS FOR THE PREPARATION OF PIGMENTS BASED ON ISOINDOLE

[75] Inventors: Bernd Kaletta, Leverkusen, Fed. Rep. of Germany; Meinhard Rolf, Charleston, S.C.

[73] Assignee: Bayer Aktiengesellschaft, Leverkusen, Fed. Rep. of Germany

[21] Appl. No.: 600,036

[22] Filed: Oct. 16, 1990

[30] Foreign Application Priority Data

Oct. 27, 1989 [DE] Fed. Rep. of Germany ....... 3935858

[51] Int. Cl.$^5$ ........................................... C07D 239/36
[52] U.S. Cl. .................................... 544/296; 548/471
[58] Field of Search ....................... 544/296; 548/471

[56] References Cited

U.S. PATENT DOCUMENTS

| | | | |
|---|---|---|---|
| 4,166,179 | 8/1979 | Lotsch | 544/296 |
| 4,480,097 | 10/1984 | Lotsch et al. | 544/296 |
| 4,751,314 | 6/1988 | Hahn et al. | 548/471 |
| 4,845,214 | 7/1989 | Lotsch et al. | 544/296 |
| 4,997,740 | 3/1991 | Harnisch et al. | 548/471 |

FOREIGN PATENT DOCUMENTS

| | | | |
|---|---|---|---|
| 539915 | 4/1957 | Canada | 548/471 |
| 879102 | 4/1953 | Fed. Rep. of Germany . | |
| 3535276 | 4/1987 | Fed. Rep. of Germany | 548/471 |
| 6134277 | 10/1981 | Japan | 548/471 |
| 698070 | 10/1953 | United Kingdom . | |

OTHER PUBLICATIONS

Pankratova et al., CA 86-1554486 (1977).
Mikhailov et al., Ca 87-7477r (1977).

Primary Examiner—Cecilia Shen
Attorney, Agent, or Firm—Sprung Horn Kramer & Woods

[57] ABSTRACT

A new process for the preparation of pigments of the formula

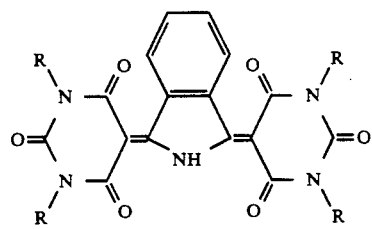

comprises first reacting phthalodinitrile in an organic medium in the presence of a base with an alcohol and then with a compound of the formula

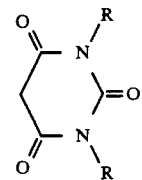

in the presence of water at a pH of 1-6.

8 Claims, No Drawings

PROCESS FOR THE PREPARATION OF PIGMENTS BASED ON ISOINDOLE

The invention relates to a new process for the preparation of pigments of the formula

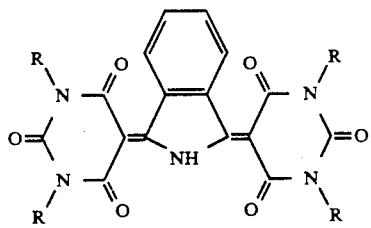
(I)

in which

R is hydrogen or a substituent,
characterized in that phthalodinitrile (II) is reacted in an organic medium with an alcohol (III) in the presence of a base, preferably at temperatures of 0° C. to 100° C., and the reaction product is then reacted, preferably without isolating it, in the presence of water with compounds of the formula

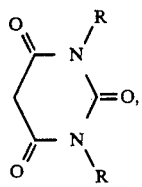
(IV)

if appropriate in the presence of surface-active compounds, in a molar ratio of 2:1, relative to (II).

Preferred radicals R, independently of one another, are hydrogen, alkyl, cycloalkyl, aryl or hetaryl.

Particularly preferred radicals R are hydrogen, $C_1$–$C_6$-alkyl and substituted or unsubstituted phenyl.

Very particularly preferably, R represents hydrogen, methyl, ethyl or phenyl.

The reaction of the reaction product from (II) and (III) with (IV) is preferably carried out at temperatures between 0° C. and 150° C. in a molar ratio of 2:1 to 6:1, relative to (II), in the pH region between 1 and 6.

Suitable alcohols (III) are preferably $C_1$–$C_6$-alkanols, $C_2$–$C_6$-alkanediols and their mono-$C_1$–$C_4$-alkyl ethers, for example methanol, ethanol, propanol, i-propanol, butanol, i-butanol, glycol and glycol derivatives, such as ethylene glycol, glycol monomethyl ether, glycol monoethyl ether, diethylene glycol monomethyl and monoethyl ether.

Suitable organic media for the reaction of (II) with (III) are preferably water-miscible organic solvents, such as cyclic or open-chain ethers, for example tetrahydrofuran, dioxane, ethylene glycol dimethyl ether, ethylene glycol diethyl ether, oligo- and polyglycols and their ethers, and dipolar-aprotic solvents, such as formamide, dimethylformamide, dimethylacetamide, N-methylpyrrolidone and dimethyl sulphoxide and their mixtures, including those with other solvents.

Particularly preferred organic media are the alcohols (III) themselves.

Suitable bases are the alkali metal alcoholates or alkaline earth metal alcoholates of the alcohols (III), such as, for example, sodium methoxide, sodium ethoxide and also potassium tert.-butoxide, the alkali metal hydroxides and alkaline earth metal hydroxides, such as, for example, sodium hydroxide, potassium hydroxide or lithium hydroxide, and the alkali metal carbonates or alkaline earth metal carbonates, such as, for example, sodium carbonate and potassium carbonate.

In detail, the reaction is carried out in such a manner that the components of the first step of the sequence are mixed in any desired order, in the course of which it may be advisable, depending on the conditions such as type and concentration of the compounds used, to remove the heat of the reaction by cooling or to accelerate the reaction by heating. In general, the reaction maybe carried out in a temperature range in which excessive cooling or heating is avoided. Such a favourable temperature range is, for example, between 0° C. and about 100° C., but the reaction can also be carried out at lower or higher temperatures.

The added base serves as catalyst and need therefore not be added in a stoichiometric ratio. However, if the amounts of base are too small, the reaction is too slow and thus uneconomical. It is therefore preferred to use 0.1 to 1 mole of base, relative to 1 mole of (II).

After the reaction is completed, the reaction product is reacted in the presence of water and, if appropriate, of an anionic, cationic or neutral surfaceactive compound with the barbituric acid derivatives of the formula (IV) in a molar ratio of about 1:2 to 1:6, preferably in a molar ratio of about 1:2 to about 1:3. The pH during this reaction is maintained between 1 and 6, preferably between 1 and 5, very particularly preferably between 1.5 and 3.5. This can be achieved either by adding acid during the reaction, or the acid can be mixed with the water before the reaction.

Suitable acids are mineral acids, aliphatic or aromatic carboxylic acids, aliphatic or aromatic sulphonic acids and mixtures of the acids mentioned.

Aliphatic water-soluble carboxylic acids, such as formic acid, acetic acid or propionic acid, are preferred.

The reaction is carried out at temperatures between 0° C. and 150° C., preferably between 20° C. and 130° C.

The pigments of the formula (I) are obtained by the process according to the invention in good yields and purity. The products obtained by the process according to the invention have high brilliance, good light and weather fastness properties and are moreover easily dispersible.

EXAMPLE 1

12.8 g of phthalodinitrile are suspended in 100 ml of methanol. 5 ml of a 30% strength sodium methoxide solution are added, and the mixture is stirred at room temperature for 2 hours to complete the reaction. The resulting solution is added at room temperature over a period of 30 minutes to a suspension of 32 g of barbituric acid, 250 ml of water and 22 ml of formic acid. Stirring at room temperature is continued for 1 hour, and the mixture is then refluxed for 3 hours. The product is filtered off with suction while hot and washed neutral with hot water to give 28.3 parts of yellow pigment.

EXAMPLE 2

The procedure of Example 1 is repeated, except that 1.2 g of powdered sodium hydroxide are used instead of the sodium methoxide solution. Yield: 31.2 g of yellow pigment.

EXAMPLE 3

The procedure of Example 1 is repeated, except that 0.9 g of powdered potassium hydroxide is used instead of the sodium methoxide solution. Yield: 31.1 g of yellow pigment.

EXAMPLE 4

The procedure of Example 1 is repeated, except that 4.1 g of potassium carbonate are used instead of the sodium methoxide solution. Yield: 32.0 g of yellow pigment.

EXAMPLE 5

The procedure of Example 1 is repeated, except that 100 ml of ethylene glycol are used instead of the methanol. Yield: 33.9 g of yellow pigment.

EXAMPLE 6

The procedure of Example 1 is repeated, except that 20 ml of acetic acid are used instead of the formic acid. Yield: 29.7 g of yellow pigment.

EXAMPLE 7

The procedure of Example 1 is repeated, except that 39 g of N,N-dimethylbarbituric acid are used instead of the barbituric acid. Yield: 34.5 g of yellow pigment.

EXAMPLE 8

12.8 g of phthalodinitrile are suspended in 100 ml of methanol. 5 ml of a 30% strength sodium methoxide solution are added, and the mixture is stirred at room temperature for 3 hours to complete the reaction. 32 g of barbituric acid, 12 ml of acetic acid and 150 ml of water are added in succession to the solution formed. Stirring at room temperature is continued for 1 hour, and the mixture is then refluxed for 3 hours.

The product is filtered off with suction while hot and washed neutral with hot water to give 31.2 g of yellow pigment.

We claim:

1. A process for the preparation of pigments of the formula

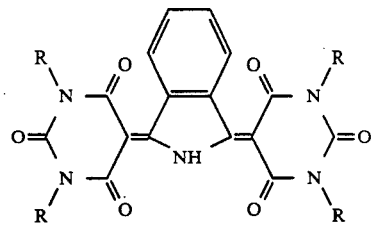

in which
each R, independently of one another, represents hydrogen or a substituent selected from the group comprising $C_1-C_6$ alkyl and phenyl, characterized in that phthalodinitrile (II) is reacted in a water-miscible organic solvent with an alcohol (III) selected from the group comprising $C_1-C_6$-alkanols, $C_2-C_6$-alkanediols and their mono-$C_1-C_4$-alkyl ethers, in the presence of a base selected from the group comprising alkali metal alcoholates and alkaline earth metal alcoholates of the alcohols (III), alkali metal hydroxides, alkaline earth metal hydroxides, alkali metal carbonates and alkaline earth metal carbonates, and the reaction product is then reacted, in the presence of water with compounds of the formula

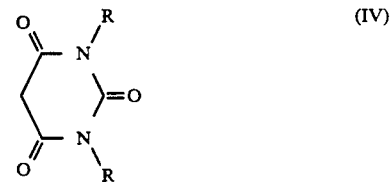 (IV)

in a molar ratio of 2:1, relative to (II), if appropriate in the present of surface-active compounds, in the pH range from 1 to 6.

2. Process according to claim 1, characterized in that the reaction is carried out by means of compounds of the formula (IV) where R is hydrogen, $C_1-C_6$-alkyl or phenyl.

3. Process according to claim 1, characterized in that an alkali metal alcoholate or an alkali metal hydroxide is used as the base.

4. Process according to claim 1, characterized in that 0.1 to 1 mole of base, relative to (II), is used.

5. Process according to claim 1, characterized in that the reaction of (II) with (III) is carried out at temperatures between 10 and 100° C.

6. Process according to claim 1, characterized in that the reaction of the reaction product from (II) and (III) with (IV) is carried out at temperatures between 20 and 130° C.

7. A process according to claim 1 wherein the reaction product of (II) and (III) is further reacted after first isolating it.

8. A process according to claim 1 wherein the reaction in the presence of water is conducted at a pH range of from 1.5 to 3.5.

* * * * *